Oct. 26, 1965  F. M. KITTNER  3,213,550
ANATOMICAL MODEL
Filed Nov. 13, 1962  3 Sheets-Sheet 2
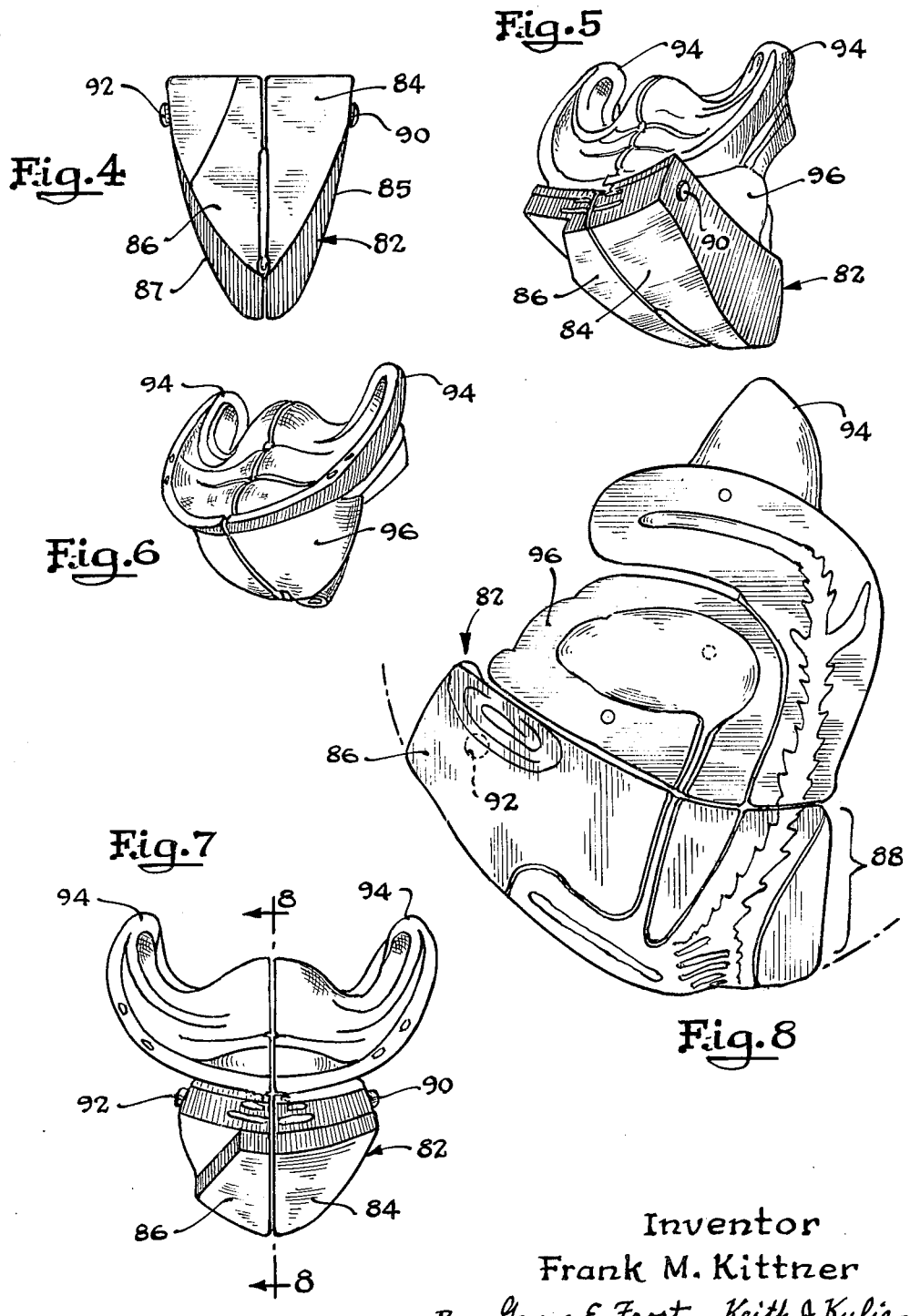
Inventor
Frank M. Kittner
By George E. Frost - Keith J. Kulie
Attorneys

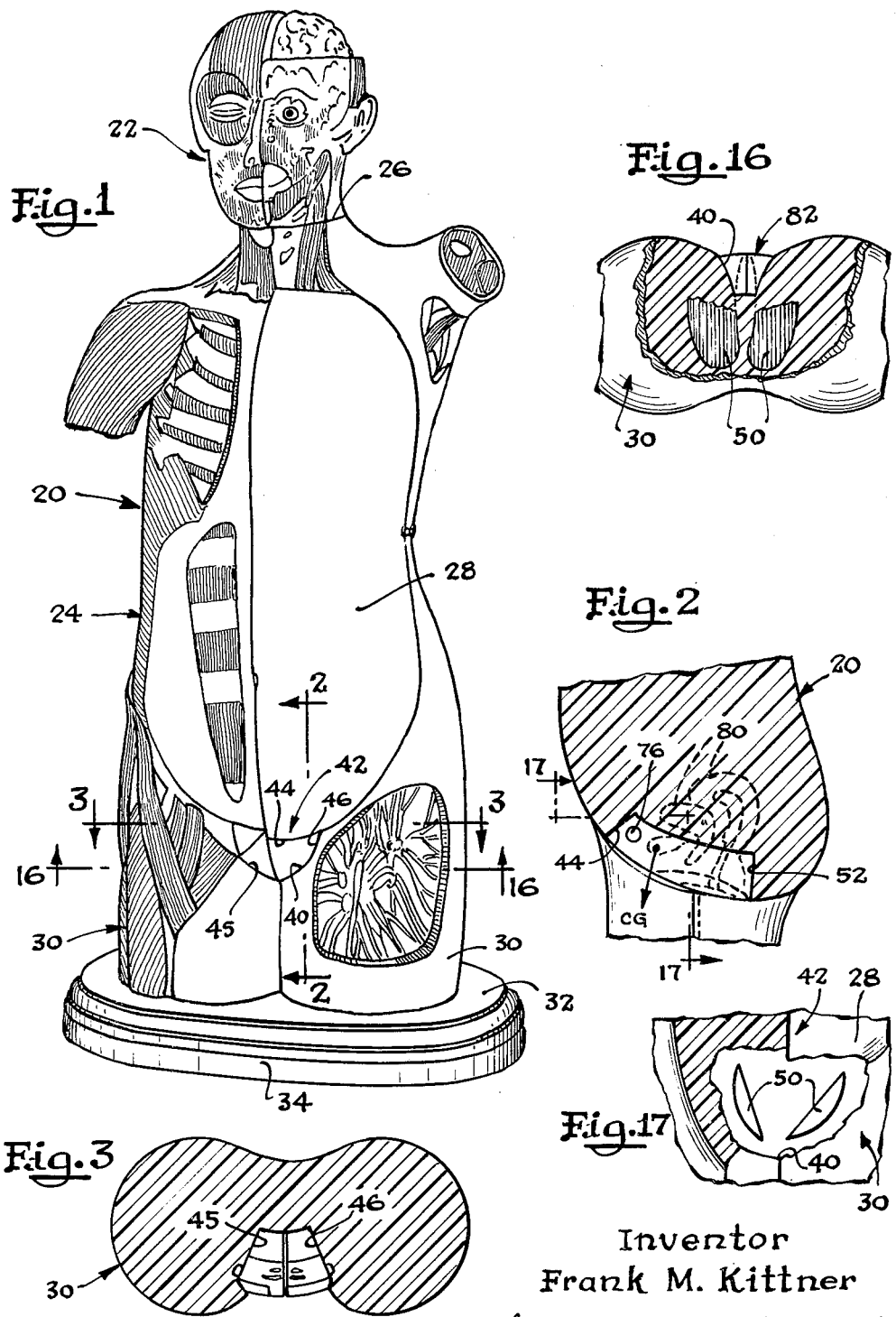

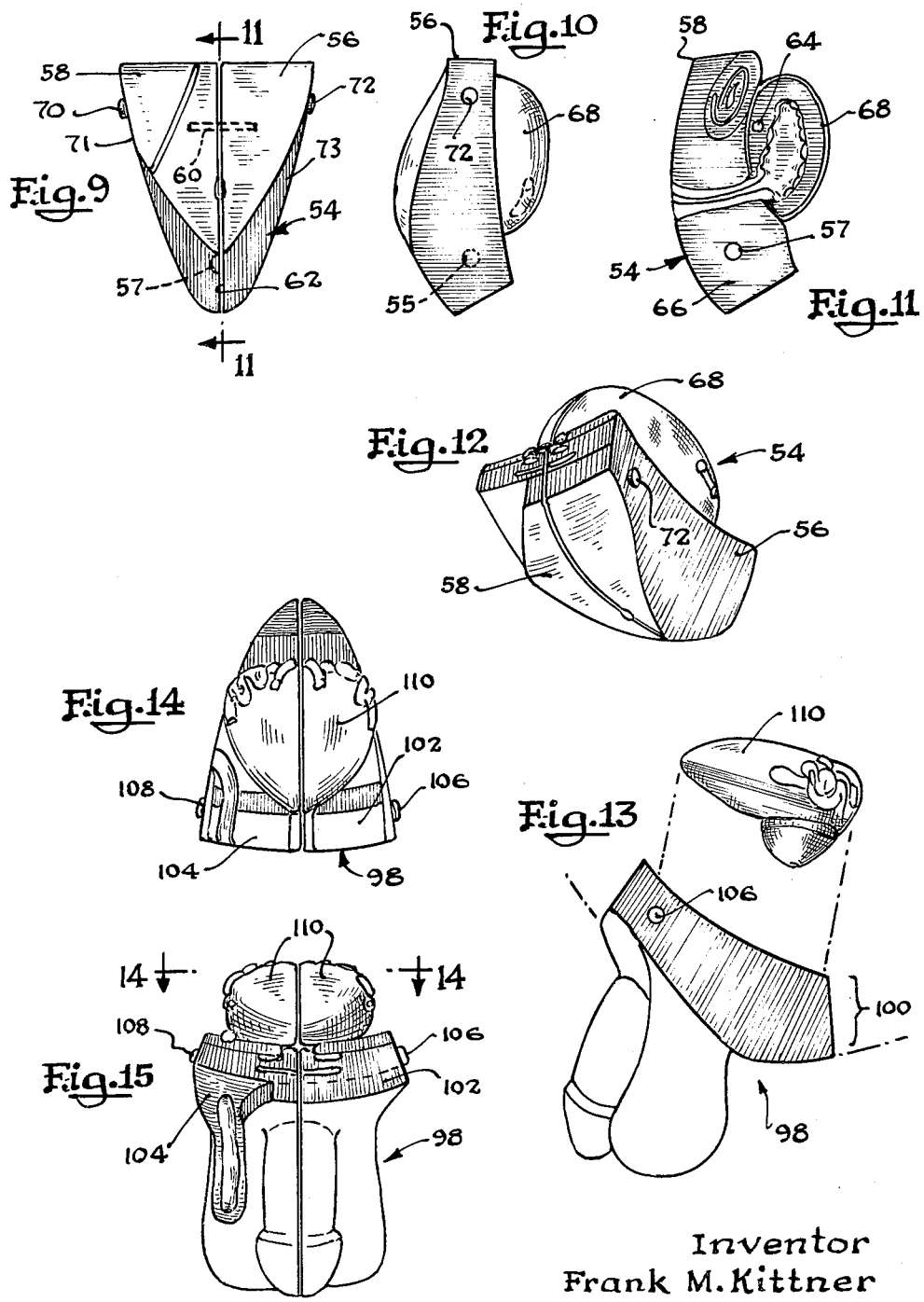

United States Patent Office 3,213,550
Patented Oct. 26, 1965

3,213,550
ANATOMICAL MODEL
Frank M. Kittner, Northbrook, Ill., assignor to Denoyer-Geppert Company, Chicago, Ill., a corporation of Illinois
Filed Nov. 13, 1962, Ser. No. 237,006
5 Claims. (Cl. 35—17)

The present invention relates to an anatomical model and more particularly it relates to a model having improved sectioning and positioning means for the removably insertable pelvic portions of the model.

The development of dissectible anatomical models placed a very attractive teaching aid in the hands of institutions responsible for instruction in body structure and functions.

In the dissectible anatomical models considerable attention is given to the means of mounting the removable portions of the models so that the dissection thereof can be realized along logical anatomical structural lines. The pelvic region of models has always posed a problem in mounting of the dissectible portions in view of the fact that in the normal model position the body organs in the pelvic region are disposed in position such that inserts comprising the organs, per se, would drop out of body recesses unless means were provided to lock them into a suitable body recess. It has been the practice of some model makers to provide a shelf in the pelvic region of the models for the insertion of the male, female and neuter organs. Such construction dictated that the recess be extended into the body of the anatomical model a substantial distance in order to place the center of gravity of the insert well within the body of the recess to thereby present a shelf holding means for the insert. It can readily be seen that in an anatomical model manufactured in accord with and along the lines of the human body, the organs in the pelvic regions are disposed in the interior region of pelvis and as such would, without restraining means, drop out of the model recesses upon insertion therein due to the center of gravity of the inserts lying without the confines of the recess. To this extent it has heretofore been convenient to manufacture anatomical models having a large shelf-like recess in the pelvic region for the retention of the inserts therein. This construction dictated that the inserts be substantially rectangular or square shaped and as such the inserts do not conform in any manner to natural anatomical structural lines. An artificial dissection of the simulated bodily organs is thus required.

In accordance with the present invention, an anatomical model is provided having interchangeable pelvic inserts dissected along natural anatomical lines. The pelvic recess in the anatomical model of the present invention extends into the model along natural lines and terminates within the model substantially at the exterior margins of the organs to be removably inserted therein. With such construction artificial dissection of the model is obviated.

It, accordingly, is a general object of the present invention to provide an improved anatomical model.

A further object of the present invention resides in the provision of an improved anatomical model having pelvic inserts adapted to be interchangeably removably insertable within a pelvic recess.

An additional object of the present invention resides in the provision of an improved anatomical model having pelvic inserts adapted to be positively structurally retained within a pelvic recess in the model to thereby permit dissection of the inserts along natural anatomical structural lines.

Another object of the present invention is in the provision of and improved anatomical model having interchangeable removably insertable pelvic inserts simulating the male and female sex organs wherein the dissection of said inserts may be realized along natural anatomical lines.

An additional object of the present invention lies in the provision of an improved dissectible anatomical model having interchangeable removably insertable pelvic inserts which are dissectible along natural anatomical structural lines and which are lightly retained within the pelvic recess so as to permit easy insertion and removal of said inserts from the recess.

Still another object of the present invention resides in the provision of an improved dissectible anatomical model having interchangeable removably insertable pelvic inserts which are supported within the pelvic recess of the model in the superior anterior region of said inserts.

The novel features which are believed to be characteristic of the present invention are set forth with particularity in the appended claims. The invention itself, however, together with further objects and advantages thereof, will best be understood by reference to the following description taken in connection with the accompanying drawings, in which:

FIGURE 1 is a schematic representation of the anatomical model with which the pelvic inserts of the present invention are employed;

FIGURE 2 is a fregmentary view taken along lines 2—2 of FIGURE 1 of the pelvic region of the model illustrating one of the pelvic inserts in position within the model;

FIGURE 3 is a sectional view taken along lines 3—3 of FIGURE 1;

FIGURE 4 is a bottom view of an insert of the present invention showing a surface view of the female external organs;

FIGURE 5 is a perspective view of the insert of FIGURE 4 illustrating in addition the positioning of the female reproductive organs with respect to the insert;

FIGURE 6 is a perspective view of the uterus, ovaries, and bladder as illustrated in FIGURE 5 and showing the mating relation thereof with respect to the insert of FIGURE 4;

FIGURE 7 is a frontal view of the insert of FIGURE 4 in combination with the uterus, ovaries, and bladder insert illustrated in FIGURE 5;

FIGURE 8 is a side view of one-half of each of the insert illustrated in FIGURES 4 through 7;

FIGURE 9 is a bottom view of the neuter gender insert of the present invention;

FIGURE 10 is a side view of the insert of FIGURE 9;

FIGURE 11 is a view of one-half of the insert of FIGURE 9 taken along lines 11—11 of FIGURE 9;

FIGURE 12 is a perspective view of the insert of FIGURES 9 and 10;

FIGURE 13 is an exploded side view of an insert of the present invention showing the male pelvic bodily organs;

FIGURE 14 is a top view of the insert of FIGURE 13;

FIGURE 15 is a front view of the male pelvic insert of the present invention;

FIGURE 16 is a sectional view taken along lines 16—16 of FIGURE 1 schematically illustrating the position of the levator ani muscle along the margins of which the inserts of the present invention are sectioned; and FIGURE 17 is a sectional view taken along lines 17—17 of FIGURE 2 schematically illustrating the frontal position of the levator ani muscle in the pubococcygeal region thereof.

Referring more particularly now to FIGURE 1, the dissectible anatomical model is illustrated generally at 20. The head portion 22 is fully removable from the torso 24 of the model and parts therefrom along section line 26.

One-half of the torso, in vertical section, is illustrated in the natural exterior state as indicated at 28, while the opposite vertical half of the model is sectioned to illustrate the sub-muscular structure, the rib cage, and the like. The breast plate 28 of the model is removably secured to the body. Removal of the breast plate 28 exposes the inner body structure (not shown) to view for study.

The thighs, indicated generally at 30, extend from the interior portion of the torso. A rotatable support plate 32 is provided upon which the anatomical model is mounted, and plate 32 being supported for rotation by the base 34.

A substantially triangular shaped frontal opening 40 is defined in the inguinal region of the torso 24. The upper wall 44 of the recess is defined along a section extending through the pubic ramus 42 inwardly of the model 20, as illustrated in FIGURE 2. The upper wall 44 of the recess 40 is defined anteriorly of the pubis of the pelvic skeletal structure of the anatomy.

The side walls 45 and 46 of the recess extend from the terminals of the upper wall 44 inwardly and downwardly. As illustrated in FIGURE 1 of the drawings, the frontal model line of the recess 40 within the torso is defined along a line substantially in the genital folds at the intersection of the inguinal area and the thighs on either side of the central torsal area. The subinguinal region of the thighs immediately adjacent the pelvic region has the lymph glands. It can readily be seen that the subinguinal thigh area can be easily sectioned with the present model construction to illustrate the position of the lymph glands within the thigh. Such sectioning and display on prior models having the shelf-like pelvic recess and mating inserts would not clearly show the anatomical structure in the subinguinal areas and to this extent the display on the dissectible models was not desirable. With the model construction disclosed herein it is readily seen that it is convenient to clearly illustrate the position of the lymph glands within the thigh.

The side walls 45 and 46 of the recess 40 extend posteriorly along places generally intersecting the margins of the pubococcygeal portion of the levator ani muscle. As illustrated in FIGURE 3 the levator ani muscle is a broad thin muscle, situated in the pelvic region at the lower end of the trunk or torso. Essentially the levator ani muscle consists of three parts one of which is the pubococcygeus. It enters in the formation of the floor of the pelvis by stretching across the lower opening and extends between the inner surface of the pelvis and the anus. The fibers pass downward and backward within the pelvic cavity from the front thereof to the middle line of the floor of the pelvis. As indicated in FIGURE 16 the levator ani muscle extends along the floor of both sides of the pelvic arch in slightly spaced relation at the lower terminal of said arch. The upward extension of the levator ani muscle 50 is illustrated more clearly in the frontal section of FIGURE 17 wherein the muscle is shown as extending upwardly and away from the middle floor area of the pelvic arch.

The side walls 45 and 46 of recess 40, extend along the margins of the pubococcygeal portion of the levator ani muscle in vertical dimension to thereby define gently inwardly arcing side walls extending toward the pelvic floor. The outer or exterior terminal of each of the side walls, as is indicated above, is defined along the line located between the inguinal and subinguinal regions of the model along both sides of the central axis of said model. The posterior terminal 52 of each of the side walls 45 and 46 of the recess 40 being defined in the perirectal region of the model 20. The recess 40 may be terminated a relatively short distance posteriorly of the model 20 in view of the recess and insert retaining construction illustrated herein. In some previous constructions it was essential to extend the posterior wall of the recess into the rectal channel or immediately adjacent thereto in order to provide sufficient shelf area to assure that the center of gravity of the insert would be within the chamber defined by the recess so that the insert would be retained within the recess in this manner. Such recess constructions required dissection of the bodily organs represented by the inserts along artificial rather than natural lines. The completed display with such construction was confusing and not clearly presented.

The sexless insert of the present invention is illustrated as 54 in FIGURE 9. The insert, preferably, is sectioned sagittally into portions 56 and 58. A pin 60 is rigidly affixed within the portion 56 of the insert 54 and extends outwardly of the inner wall 62 of the portion 56. A mating opening 64 is defined in the inner wall 66 of the portion 58 to receive the pin 60 therein. The pin 60 is frictionally engaged within the opening 64 to hold the separate portions of the insert in assembled relation.

A projection 55 extends from the wall 62 of portion 56. A shallow depression 57 is provided in the wall 66 in mating relation to the projection 55 when the insert is assembled. The projection 55 and depression 57 in combination with the pin 60 and opening 64 gives two point, positive assembly positioning for the insert 54.

A portion 68 representing the bladder is integrally molded to the insert section 54 in the sexless insert. The sexless insert 54 may be employed for instructive purposes in institutions that do not develop the function and position of the sex organs of the body. It also may be employed for various other special illustrative purposes.

The insert 54, without the bladder portion 68, defines the basic shape of each of the remainder of the inserts adapted to be interchangeably inserted within the body recess 40. As illustrated, the side view of the insert 54 is substantially rectangular in form with the exterior portion of the insert following the natural anatomical contours. The bottom view of the insert, as in FIGURE 9, is substantially triangular shaped and, as indicated hereinabove, is sectioned along the margins of the levator ani muscle in the pubococcygeal region thereof.

It can readily be seen from the side section view of FIGURE 2 that if the insert 54 were to be inserted within recess 40 in the anatomical model torso 24 it would drop out. The center of gravity C.G. of the insert is disposed along a line outside of the confined portion of the recess 40. This gives rise to an unstable insert condition when the insert is assembled in the recess 40. In order to provide for the natural sectioning and still have stable positioning of the inserts projections 70 and 72 are provided along the outer wall of the insert 54. The projection 70 is molded integral with and extends a slight distance outwardly from the outer wall 71 of the portion 58. The projection 72 is integral with and extends outwardly from the wall 73 of portion 56 a slight distance.

A mating recess 76 is provided in each wall, 45 and 46 respectively, of the recess 40. The recesses 76 are adapted to receive the projections 70 and 72 of each portion of the insert 54. The general body of the insert is dimensioned such that it will be snugly but freely received within the recess 40 of the anatomical model. With such construction the projections 70 and 72 of the insert will be slightly deflected or depressed upon insertion of the insert within the recess. The projections will resume their static positions upon extension into the mating recesses 76 in the side walls of the model recess 40 to position the upper portion of the insert 54 within the recess 40. The projections 70 and 72 in combination with recess 76 serve therefor to position and retain the upper portion of the insert 54. The lower or posterior portion of the insert rests on the bottom wall of the recess 40. Therefore, the insert when assembled in the anatomical model is provided with positive three point support by the projections on opposite walls thereof and the support of the posterior portion of the insert by the recess floor in the model.

As indicated schematically at 80 in FIGURE 2, various other bodily organs may be inserted into a large model cavity as dictated by the instructive requirements and construction of the model. The adjacent inserts representing bodily organs, in the pelvic region of the torso may be supported within the model by the pelvic inserts disclosed here.

The pelvic insert representing the female bodily organs is indicated generally at 82 in FIGURE 4. This insert is sectioned sagittally to define two half-portions 84 and 86 adapted to be assembled into mating relation to define the complete unit. As indicated in FIGURES 4 and 8, the general outline of the female pelvic insert 82 is substantially the same as that for the sexless insert 54. The insert 82 is adapted to be received within the same bodily recess 40 in substantially the same manner as the insert 54 and is fully interchangeable therewith.

The insert supporting projections 90 and 92 extend from the outer sidewalls 85 and 87 of the portions 84 and 86, respectively. The projectioins are adapted to be received by the mating depressions 76 in the side walls of the recess 40 of the anatomical model to support the insert within the recess.

The model portions representing the uterus, ovaries, and bladder are illustrated at 94 and 96, respectively, in FIGURES 5 through 8 and are shown in assembled relation with the female pelvic insert in FIGURES 5, 7 and 8. When the model is in assembled relation within the torsal opening in the model the female pelvic insert is adapted to position and support the uterus, ovaries, and bladder, for example, within the model in natural anatomical position. It is readily seen that with the construction of the present invention the female bodily organs are dissectible along natural anatomical lines to provide for a logical and clearly understandable display of such organs. Artificial sectioning of the bodily organs for mechanical support purposes is not required.

As illustrated in FIGURES 6 and 8, the female body organs adjacent to the pelvic insert are provided such that they will rest upon the pelvic insert to provide anatomical continuity and logical dissectability with concomitant free access for assembly and disassembly of the model parts essential for the most effective model usage.

The male pelvic insert is illustrated generally at 98 FIGURES 13, 14 and 15. The basic contour of the male pelvic insert 98 is illustrated generally at 100 and is substantially the same in relation to adjacent pelvic parts as that shown for the insert 54. The side section of the male insert 98 is generally rectangular in shape. The insert extends poseriorly to define a generally triangular shape adapted to be received within the triangular shaped recess 40 of the pelvic region of the anatomical model. The male pelvic insert is sectioned sagittally to define two portion 104 and 102. Each of the portions 102 and 104 defines a projection 106 and 108, respectively, extending outwardly from the outer sidewall portion of each. The section 110 representing the bladder of the anatomical model is shown in exploded relation to the pelvic insert 98 in FIGURE 13 and in assembled relation with the insert in FIGURES 14 and 15. The non-sex portions of each of the inserts are included for orientation of the insert with respect to the model and to illustrate the natural sectioning permissible with the construction set forth herein.

The male pelvic insert is adapted to be retained within the pelvic recess 40 in the same manner as that described in conjunction with the insert 54. The projections 106 and 108 on the side wall of each portion of the insert 98 are received within the mating recesses 76 in the side walls of the recess 40 to define a two point support for the anterior portion of the insert. The posterior insert portion is supported by the floor of the pelvic recess 40 to thereby define a three-point support for the insert to retain it within the cavity pelvic recess 40.

It should be noted, therefore, that the model construction set forth herein, particularly as it relates to the interchangeable pelvic inserts of the anatomical model, provides positive three-point insert support and further provides a construction which permits dissection of the representative body organ sections along natural anatomical lines for maximum effectiveness of the model for instruction purposes.

The three-point support is defined by the mating interlocking engagement of the projections on the sidewalls of each of the inserts and the recesses on the sidewalls of the pelvic recess 40 and the support of the base of the inserts by the floor of the pelvic recess 40.

It will be noted that the mating ball and socket conformations (76, FIGURES 3 and 16; 90, 92, FIGURES 4-7; 70, 72, FIGURES 9-12; and 106, 108, FIGURES 13-15) are deviations from the actual sheet-like configuration of the levator ani muscle, which in an exact reproduction appears as a striated surface. Since these ball and socket conformations are of relatively small area and do not depart greatly from the surface of the levator ani muscle, they do not interfere substantially with the faithful anatomical reproduction. Thus, the desirable sectioning of the model along natural anatomical lines is preserved while at the same time the sex inserts are stably and removably positioned.

In the appended claims, the term upper margin of the recess is used to designate the wall or face 44, FIGURE 2, which is of generally planar shape. The term ceiling of the recess is used to designate the ceiling 110, FIGURE 2, which at its lateral margins mates with the side walls 45, 46, of the recess 40 (i.e., the positions of the levator ani muscle 50, FIGURE 16) and between these margins extends in dome-like conformation to clear the removable parts as indicated by dotted lines 80, FIGURE 2.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. A dissectible anatomical model adapted to have body inserts removably insertable therein, said model having a torso with a recess defined in the pelvic region thereof the side wall boundaries of said recess being defined bilaterally by the margins of the pubococcygeal portion of the levator ani muscle, said bilateral margins extending from the public ramus posteriorly and terminating in the perirectal region and anterior to the rectum to define the posterior boundary of said side walls, said bilateral margins terminating anteriorly of the model along lines located between the inguinal and subinguinal regions on both sides, each of said side walls having a small shallow depression defined therein deviating from the said recess configuration, the upper margin of said recess being defined through a section of the public ramus inwardly of said model in the region of the pubis and anteriorly of the sex parts, the posterior boundary of the recess being defined along a plane extending between the posterior terminals of said side walls whereby an insert that just fits the recess but not the said depressions is unstable and will tumble from the model; and a shaped bisected insert removably receivable in said recess, said insert fitting snugly within said recess, each of the side walls of the portions of said insert having a small projection thereon inwardly of the exterior portion of said insert and extending outwardly a short distance from the general plane of the side walls of said insert portions, said projections when said insert is positioned within said torso recess being in mating relation with the small shallow depressions defined within the walls of the torso and adapted to be received therein to define anterior support means for said insert to maintain said insert within the recess, said insert being of material accommodating slight deflection upon insertion into the recess until the mating position is reached.

2. An anatomical model adapted to have pelvic body inserts removably insertable therein, said model having a torso with a recess defined in the pelvic region thereof, the side walls of said recess being defined along a plane extending through the margins of the pubococcygeal portion of the levator ani muscle, said side walls extending from the pubic ramus posteriorly and terminating anteriorly of the rectal channed to define the posterior boundary of said side walls, said walls terminating anteriorly of the model along lines located between the inguinal and subinguinal regions on both sides, each of said side walls having a small shallow depression defined therein deviating from the said recess configuration, the upper wall of said recess being defined through a section of the pubic ramus inwardly of said model in the region of the pubis and anteriorly of the sex parts, the posterior wall of the recess being defined along a plane extending between the posterior terminals of said side walls; and a series of shaped inserts interchangeably removably receivable in and fitting snugly therein, the side walls of said insert each having small projections extending outwardly therefrom, said small projections being in mating relation to the small shallow depressions in the walls of the recess of the torso when the inserts are inserted therein to define anterior support means for said inserts to maintain the inserts within the recess, said insert being of material accommodating slight deflection upon insertion into the recess until the mating portion is reached.

3. An anatomical model adapted to have pelvic body inserts removably insertable therein, said model having a torso with a recess defined in the pelvic region thereof, the side walls of said recess being defined along a plane extending through the margins of the pubococcygeal portion of the levator ani muscle, said side walls extending from the public ramus posteriorly and terminating anteriorily of the rectal channel to define the posterior boundary of said side walls, said walls terminating anteriorly of the model along lines located between the inguinal and subinguinal regions on both sides, each of said side walls having a small shallow depression defined therein deviating from the said recess configuration, the upper wall of said recess being defined through a section of the pubic ramus inwardly of said model in the region of the pubis and anteriorly of the sex parts, the posterior wall of the recess being defined along a plane extending between the posterior terminals of said side walls whereby an insert that just fits the recess but not the said depressions is unstable and will tumble from the model; and a series of shaped sagittally sectioned inserts interchangeably removably receivable in said recess and fitting snugly therein, the side walls of said inserts each having small projections extending outwardly therefrom, said small projections being in mating relation to the small shallow depressions in the walls of the recess of the torso when the inserts are inserted therein to define anterior support means to maintain the inserts within the recess, said inserts being of material accommodating slight deflection upon insertion into the recess until the mating position is reached, one of said interchangeable series of removably insertable inserts defining the male sex organs and another of said series defining the female sex organs.

4. A dissectible anatomical model adapted to have pelvic body inserts removably insertable therein, said model having a torso with a recess defined in the pelvic region thereof the side wall boundaries of said recess being defined bilaterally by the margins of the pubococcygeal portion of the levator ani muscle, said bilateral margins extending from the pubic ramus posteriorly and terminating in the perirectal region and anterior to the rectum to define the posterior boundary of said side walls, said side walls terminating anteriorly of the model along lines located between the inguinal and subinguinal regions on both sides of the central longitudinal axis of said model, each of said side walls having a small shallow depression therein deviating from the said recess configuration and defining a socket, the upper margin of said recess being defined through the section of the pubic ramus inwardly of said model in the region of the pubis and anteriorly of the sex parts, the posterior boundary of the recess being defined along a plane extending between the posterior terminals of said side walls whereby an insert that just fits the recess but not the said depressions is unstable and will tumble from the model; and a shaped, sagittally sectioned insert removably receivable in said recess, the side wall of each of the sections of the insert having a small projection extending therefrom, each of said small projections on said side walls being in mating relation with the small shallow depressions defined with the walls of the recess when the insert is positioned therein, said small projections and small shallow depressions, in combination, defining a ball and socket arrangement adapted to position and support said insert within the recess, said insert being of material accommodating slight deflection upon insertion into the recess until the mating position is reached.

5. A dissectible anatomical model adapted to have pelvic body inserts removably insertable therein, said model having a torso with a recess defined in the pelvic region thereof the side wall boundaries of said recess being defined bilaterally by the margins of the pubococcygeal portion of the levator ani muscle, said bilateral margins extending from the pubic ramus posteriorly and terminating in the perirectal region and anterior to the rectum to define the posterior boundary of said side walls, said side walls terminating anteriorly of the model along lines located between the inguinal and subinguinal regions on both sides of the central longitudinal axis of said model, each of said side walls having a small shallow depression therein deviating from the said recess configuration and defining a socket, the upper margin of said recess being defined through the section of the pubic ramus inwardly of said model in the region of the pubis and anteriorly of the sex parts, the posterior boundary of the recess being defined along a plane extending between the posterior terminals of said side walls, whereby an insert that just fits the recess but not the said depressions is unstable and will tumble from the model, the ceiling of said recess being defined by the margins of the bladder and sex organs; and a shaped sagittally sectioned insert removably receivable in said recess said insert fitting snugly within said recess, the side wall of each of the sections of the insert having a small projection extending therefrom, each of said projections on said side walls being in mating relation with the depressions defined with the walls of the recess when the insert is positioned therein and the insert being slightly deflected upon insertion into the recess until the mating position is reached, said projections and shallow depressions, in combination, defining a ball and socket arrangement adapted to position and to support anteriorly the insert within the recess.

References Cited by the Examiner

UNITED STATES PATENTS

| | | | |
|---|---|---|---|
| 2,472,819 | 6/49 | Gieson | 35—20 X |
| 2,678,505 | 5/54 | Munson | 35—17.1 |
| 2,763,070 | 9/56 | McCormick | 35—17.1 |
| 3,091,894 | 6/63 | Cohn | 46—169 |

FOREIGN PATENTS 1,112,903  11/55  France.

EUGENE R. CAPOZIO, *Primary Examiner.*

JEROME SCHNALL, *Examiner.*